Oct. 16, 1962 R. F. STALLMAN 3,058,791
BEARINGS
Filed April 13, 1959

INVENTOR.
RALPH F. STALLMAN
BY George B. White
ATTORNEY.

United States Patent Office 3,058,791
Patented Oct. 16, 1962

3,058,791
BEARINGS
Ralph F. Stallman, % Trurol Bearing Company,
842 Mandana Blvd., Oakland 10, Calif.
Filed Apr. 13, 1959, Ser. No. 806,119
7 Claims. (Cl. 308—238)

The primary object of the invention is to provide bearings with Teflon bound in the bearing surface in intersecting and intercommunicating grooves wherein the inclined walls of the grooves tie the embedded Teflon together continuously and also cover the apices of pyramidal bosses formed at the intersections of the grooves so that the contacting surface wipes itself clean, holds minute metal particles, prevents galling of the contacting surfaces, and prevents the pressing of Teflon off said bearing surface.

Another object of the invention is to provide a method for binding Teflon to a bearing surface in a continuous mass by forming a matrix with intersecting grooves and inclined walls and with substantially pyramidal bosses at the intersections of said grooves, spraying a Teflon solution into said matrix and sintering the Teflon so as to fuse it into a resilient mass bound in said bearing surface.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings. With the foregoing and other objects in view, which will be made manifest in the following detailed description, reference is had to the accompanying drawings for the illustrative embodiment of the invention, wherein:

The problem of binding Teflon into a bearing presented many difficulties, primarily because of a tendency for the lateral extrusion of the Teflon along the bearing surface and out of the bearing, and also the smearing of the Teflon, and the forming of the Teflon into a mass which tended to rotate in the journal of a rotating element or shift with the sliding of a platen or the like.

The method and bearing herein described can be utilized in plain bearings of various types, such as spherical bearings, journals, bearings of semicircular cross-section, flat platen surfaces, all forms being included in the term "bearing surface" as herein used.

The method for forming the bearing surfaces herein includes the following steps:

The bearing surface is grooved in a suitable manner so as to form a matrix by a series of parallel grooves intersecting a second series of parallel grooves. It is critical that the sides of each groove be inclined, converging inwardly of the bearing surface. In the herein illustration each groove is of substantially V-shaped cross-section, and the respective grooves of the series intersect each other at about 90 degrees. The grooves in each parallel series are closely adjacent to one another so that the ribs or lands between adjacent grooves are also of substantially V-shaped cross-section inverted with respect to the grooves, namely the apices of the ribs form lands on the bearing surface proper. The intersecting of such grooves results in a plurality of pyramidal bosses the apices of which form comparatively minute lands on the bearing surface so that the total area of the lands is less than 10% of the total area of the bearing surface. Increase over said 10% rapidly reduces the efficiency of the bearing.

Then Teflon (poly-tetra-fluoro-ethylene) in suitable solution, for instance, in water solution, is applied to the grooved bearing surface so as to fill said grooves and cover said apices or lands. At present the Teflon solution is sprayed onto the bearing surface.

Then the Teflon is suitably sintered, at present at about 500° F. until it is set into a continuous mass in said matrix.

Figure 1:
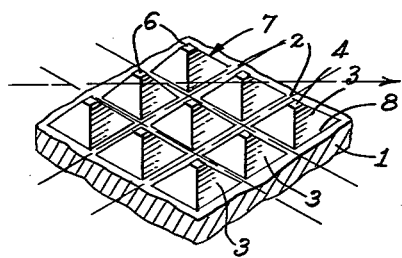
FIG. 1 is a fragmental perspective view of the matrix formed in a bearing surface.
Figure 2:
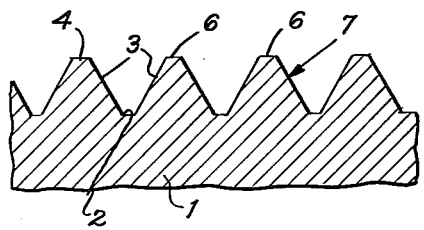
FIG. 2 is a fragmental cross-sectional view of said matrix.
Figure 3:
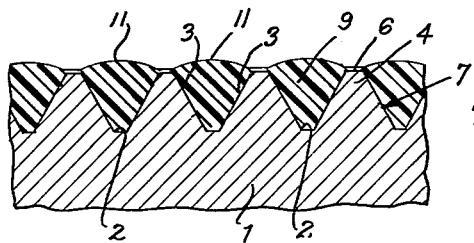
FIG. 3 is a fragmental cross-sectional view of the bearing surface with Teflon bound therein.
Figure 4:
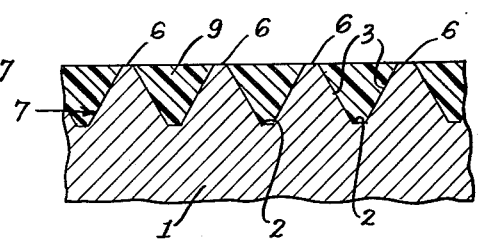
FIG. 4 is a fragmental cross-sectional view of the bearing surface with some of the Teflon worn off and the apices of the pyramidal bosses temporarily exposed.

The bearing surface so produced is a bearing body 1 with a matrix formed in its bearing surface by intersecting series of grooves 2. The grooves in each series are parallel and the respective grooves of the series intersect each other at about 90 degrees. Each groove is of generally V-shaped cross-section and its inclined walls 3 are at such angle that the locking surfaces are at equal angles in all directions. Each series of parallel grooves is at an acute angle to the axis of the bearing. In platen bearings each series is at an acute angle to the direction of relative movement on the platen. In this illustration said angle is about 45° included angle with respect to the axis or to the direction of movement. The axis of relative movement on the bearing is indicated by the broken line X in FIG. 1.

The adjacent grooves 2 of each series are in such proximity that ribs 4 formed between adjacent grooves 2 are also of substantially V-shaped cross-section but inverted with respect to the cross sections of the adjacent grooves 2. The apices of the ribs 4 form lands 6 on the bearing surface. Thus the total area of lands 6 forms a very small area of the bearing surface proportionately to the total area of the grooves 2 and to total bearing surface.

The intersections of the series of grooves 2 form a plurality of spaced pyramidal bosses 7. Each pyramidal boss 7 has a base 8 formed at the apices of the adjacent surrounding four grooves 2. The segments of the inclined walls 3 of the respective four intersections form the sides of each boss 8 converging toward a top or apex which forms the land 6 on the bearing surface.

The sintered Teflon mass 9 bound in the grooves 2 of the matrix surrounds each boss 8 and is continuous throughout the entire bearing. The Teflon mass 9 forms bulges or domes 11 slightly above the level of the apices or lands 6 and also covers the apices or lands 6.

The Teflon mass 9 is resilient to a certain extent and is slightly compressed into the grooves 2 under force or pressure exerted on the bearing surface. This force, however, acting upon the inclined walls of the grooves 2 at an angle has a substantial horizontal component with a resultant force substantially at right angles to the respective angles of the respective inclined sides, thus it transmits compressive force to the adjacent parts of the Teflon mass, thereby strengthens the locking force on the Teflon mass in said grooves and against said pyramidal bosses 7 and prevents shifting or smearing of the Teflon relatively to said pyramidal bosses 7.

If, as and when the Teflon on the lands 6 wears off, then the proportionately minute exposed metal wears off comparatively quickly to below the level of the Teflon mass 9 and the exposed Teflon layer spreads over the lands 6. The bearing surface wipes itself clean, presses minute particles of metal or impurities into the Teflon mass 9 and obviates the forming of large globules, and thus prevents galling of the member moving relatively to the bearing surface.

I claim:

1. In a matrix, a bearing body, a bearing surface on said body, intersecting series of grooves throughout said matrix surface forming a continuous interconnected matrix cavity, a plurality of generally pyramidal bosses formed at the intersections of said grooves, the apices of said bosses forming lands on said matrix surface, and a Teflon mass bound in said matrix so as to fill said grooves and cover said lands.

2. The bearing defined in claim 1, wherein each of said grooves is of substantially V-shaped cross-section.

3. The bearing defined in claim 1 wherein the total area of said lands is less than 10 percent of the total area of said bearing surface.

4. The bearing defined in claim 1, wherein said Teflon mass is formed into spaced bulges above said grooves and is resiliently compressible.

5. The bearing defined in claim 1 wherein said intersecting series of grooves intersect at about 90 degrees throughout said matrix surface.

6. The bearing defined in claim 1, wherein each series of grooves is at an acute angle to the axis of relative movement on the bearing.

7. In a dry lubricant matrix, a bearing body, matrix surface on said body, a matrix formed on said matrix surface including a plurality of intersecting grooves continuous interconnected throughout the matrix surface, the sides of said grooves being inclined and converging away from said matrix body, said intersecting grooves forming at each intersection thereof substantially rectangular pyramidal bosses, the apices of said bosses forming lands between said grooves, and a compressible solid dry lubricant body filling said grooves and covering said lands.

References Cited in the file of this patent

UNITED STATES PATENTS

| | | |
|---|---|---|
| 1,732,273 | Landon | Oct. 22, 1929 |
| 2,227,969 | Haushalter | Jan. 7, 1941 |
| 2,268,868 | Given | Jan. 6, 1942 |
| 2,330,635 | Siebel | Sept. 28, 1943 |
| 2,554,008 | Burger | May 22, 1951 |
| 2,615,768 | Schluchter | Oct. 28, 1952 |
| 2,770,586 | Davis | Nov. 13, 1956 |
| 2,815,253 | Spriggs | Dec. 3, 1957 |
| 2,835,540 | Jorgensen | May 20, 1958 |
| 2,846,251 | Herbenar | Aug. 5, 1958 |
| 2,885,248 | White | May 5, 1959 |

FOREIGN PATENTS

| | | |
|---|---|---|
| 683,404 | Great Britain | Nov. 26, 1952 |

OTHER REFERENCES

Bearings of Du Pont Teflon by Dr. W. B. Happoldt Jr., in Automotive Industries of Sept. 1, 1954, pages 107 and 108.